United States Patent [19]

Blancke et al.

[11] Patent Number: 5,279,483
[45] Date of Patent: Jan. 18, 1994

[54] ATTITUDE CONTROL SYSTEM FOR A THREE-AXIS STABILIZED SATELLITE ESPECIALLY A REMOTE SENSING SATELLITE

[75] Inventors: Bernard Blancke, Le Cannet; Marc Attanasio, Mougins; Patrick Maute, Valbonne; Issam-Maurice Achkar, Cannes-La-Bocca, all of France

[73] Assignee: Aerospatiale Societe Nationale Industrielle, France

[21] Appl. No.: 806,599

[22] Filed: Dec. 12, 1991

[30] Foreign Application Priority Data

Dec. 21, 1990 [FR] France ............... 90 16150

[51] Int. Cl.$^5$ .................. B64G 1/32; B64G 1/36
[52] U.S. Cl. .................. 244/165; 244/166; 244/171; 244/176; 364/434
[58] Field of Search ........... 244/164, 165, 166, 170, 244/171, 176, 177; 364/433, 434

[56] References Cited

U.S. PATENT DOCUMENTS

| | | | |
|---|---|---|---|
| 3,813,067 | 5/1974 | Mork | 244/165 |
| 4,010,921 | 3/1977 | Pistiner et al. | 244/166 |
| 4,084,773 | 4/1978 | Schmidt, Jr. et al. | 244/166 |
| 4,114,841 | 9/1978 | Muhlfelder et al. | 244/166 |
| 4,230,294 | 10/1980 | Pistiner | 244/165 |
| 4,521,855 | 6/1985 | Lehner et al. | 364/434 |
| 4,732,353 | 3/1988 | Studer | 244/165 |
| 4,916,622 | 4/1990 | Raman et al. | 244/166 |
| 5,047,945 | 9/1991 | Paluszek | 364/434 |
| 5,054,719 | 10/1991 | Maute | 244/164 |
| 5,108,050 | 4/1992 | Maute | 244/171 |
| 5,139,218 | 8/1992 | Bird et al. | 244/171 |
| 5,201,833 | 4/1993 | Good et al. | 364/434 |
| 5,205,518 | 4/1993 | Stetson, Jr. | 244/165 |

FOREIGN PATENT DOCUMENTS

| | | |
|---|---|---|
| 0363243 | 9/1989 | European Pat. Off. |
| 3941654 | 6/1991 | Fed. Rep. of Germany ...... 244/165 |

OTHER PUBLICATIONS

Kevin J. Heffernan et al. "The Magsat Attitude Control System" Johns Hopkins APL Technical Digest, vol. 1, No. 3 (Jul.-Sep. 1980).
Evolution of an Attitude Control System for Body-Stabilized Communication Spacecraft By: L. Muhlfelder, RCA Astro-Electronics.

Primary Examiner—Michael S. Huppert
Assistant Examiner—Virna Lissi Ansley
Attorney, Agent, or Firm—Remy J. VanOphem

[57] ABSTRACT

An attitude control device for a three-axis stabilized satellite in terrestrial orbit embodies an attitude sensing system adapted to deliver roll, yaw and pitch attitude signals, a set of at least three non-parallel axis momentum wheels and a set of at least two magnetic coils oriented at least approximately in two non-parallel directions in the roll/yaw plane. A primary control loop embodies a processor and controller connected between the attitude sensing system and the set of at least three momentum wheels. It is adapted to determine from attitude signals and attitude set point signals attitude correction signals for the momentum wheels so as to apply to the satellite primary attitude correction torques. A secondary control loop embodies a coil controller connected between the processor and controller, the set of at least three momentum wheels and the set of at least two magnetic coils. It is adapted to determine from attitude correction signals addressed to the momentum wheels and from signals representative of the behavior of the wheels compensation signals to be applied to the magnetic coils so that by interaction with the terrestrial magnetic field secondary attitude correction torques are applied to the satellite. A circuit for desaturation in pitch of the set of at least three momentum wheels is connected between the set of at least three momentum wheels and a pitch actuator.

10 Claims, 7 Drawing Sheets

ATTITUDE CONTROL SYSTEM FOR A THREE-AXIS STABILIZED SATELLITE ESPECIALLY A REMOTE SENSING SATELLITE

BACKGROUND OF THE INVENTION

1. Field of the Invention

The invention concerns the stabilization of the attitude of a satellite (or, more generally, a spacecraft station carrying a payload) in terrestrial orbit, in practice a circular orbit and preferably a geostationary orbit.

2. Description of the Prior Art

At present three-axis stabilized geostationary satellites are almost exclusively all telecommunication satellites for which pointing in yaw and stability with regard to high-frequency vibration are not critical criteria.

Such satellites in practice carry momentum wheels conferring upon them sufficient gyroscopic stiffness to reduce yaw errors (this applies in particular to the ARABSAT, EUTELSAT-2 and TVSAT-2 satellites).

This attitude control principle is insufficiently accurate for meteorological remote sensing satellites for which the accuracy of the attitude of the satellite is a critical parameter; similar precision is also a requirement, to which no more satisfactory a solution has yet been found, in the case of scientific experiment spacecraft, for example.

Broadly speaking, the first criterion which must be satisfied by a telecommunication satellite is that it should be cost-effective, and therefore of low cost, whereas remote sensing and "scientific experiment" satellites must meet performance criteria irrespective of the cost implications.

The previously mentioned solution using momentum wheels for stabilization has drawbacks including a high level of vibration even though the passive gyroscopic yaw control that it provides is necessarily imprecise.

The invention is directed to enabling highly accurate attitude control of a three-axis stabilized geostationary satellite or spacecraft of the active control type, but offering high reliability; minimizing use of thrusters and so improving the stability of the spacecraft; minimizing transient orbit control conditions; facilitating seasonal 180° slew maneuvers; enabling compensation of internal disturbances on these three axes; and minimizing the problems of onboard resonance.

SUMMARY OF THE INVENTION

The present invention is an attitude control device for a three-axis stabilized satellite in terrestrial orbit.

The device embodies an attitude sensing system adapted to deliver roll, yaw and pitch attitude signals, a set of at least three non-parallel axis momentum wheels, and a set of at least two magnetic coils oriented at least approximately in two non-parallel directions in the roll/yaw plane.

The device also includes a primary control loop having a processor and controller connected between the attitude sensing system and the set of at least three momentum wheels which is adapted to determine from attitude signals and attitude set point signals attitude correction signals for the momentum wheels so as to apply to the satellite primary attitude correction torques.

The device also embodies a secondary control loop with a coil controller connected between the processor and controller, the set of at least three momentum wheels and the set of at least two magnetic coils which is adapted to determine from attitude correction signals addressed to the momentum wheels and from signals representative of the behavior of the wheels compensation signals to be applied to the magnetic coils so that by interaction with the terrestrial magnetic field secondary attitude correction torques are applied to the satellite.

A circuit for desaturation in pitch of the set of at least three momentum wheels connected between the set of at least three momentum wheels and a pitch actuator is also provided.

According to preferred features of the invention the signals representative of the behavior of the momentum wheels are speed signals delivered by tachometers associated with each momentum wheel.

The attitude sensing system embodies a terrestrial sensor and a Pole Star sensor.

The set of at least three momentum wheels constitute a momentum wheel aligned on the pitch axis and two momentum wheels with axes parallel to the roll/yaw plane which are respectively aligned on the roll and yaw axes. The set of at least three momentum wheels includes at least a fourth wheel which is aligned on the bisector of the trihedron formed by the axes of the other three momentum wheels.

The two magnetic coils are oriented respectively on the roll and yaw axes.

The processor and controller is of the proportional-integral type.

The primary control loop embodies three control circuits which are specific to respective momentum wheels.

The secondary control loop receives momentum wheel behavior set point signals and is adapted to apply to the coils signals adapted to generate secondary attitude correction torques while maintaining the behavior of the momentum wheels within a predetermined range about the set point signals.

Note that the invention proposes, for attitude control on three axes of a satellite in geostationary orbit, combining momentum wheels (therefore a set of wheels with a null kinetic moment on average), a terrestrial sensor, a Pole Star sensor and magnetic coils, which combination can satisfy the stated objectives.

Objects, features and advantages of the invention will emerge from the following description given by way of non-limiting example with reference to the appended drawings.

DETAILED DESCRIPTION OF THE PREFERRED EMBODIMENT

Figure 1:
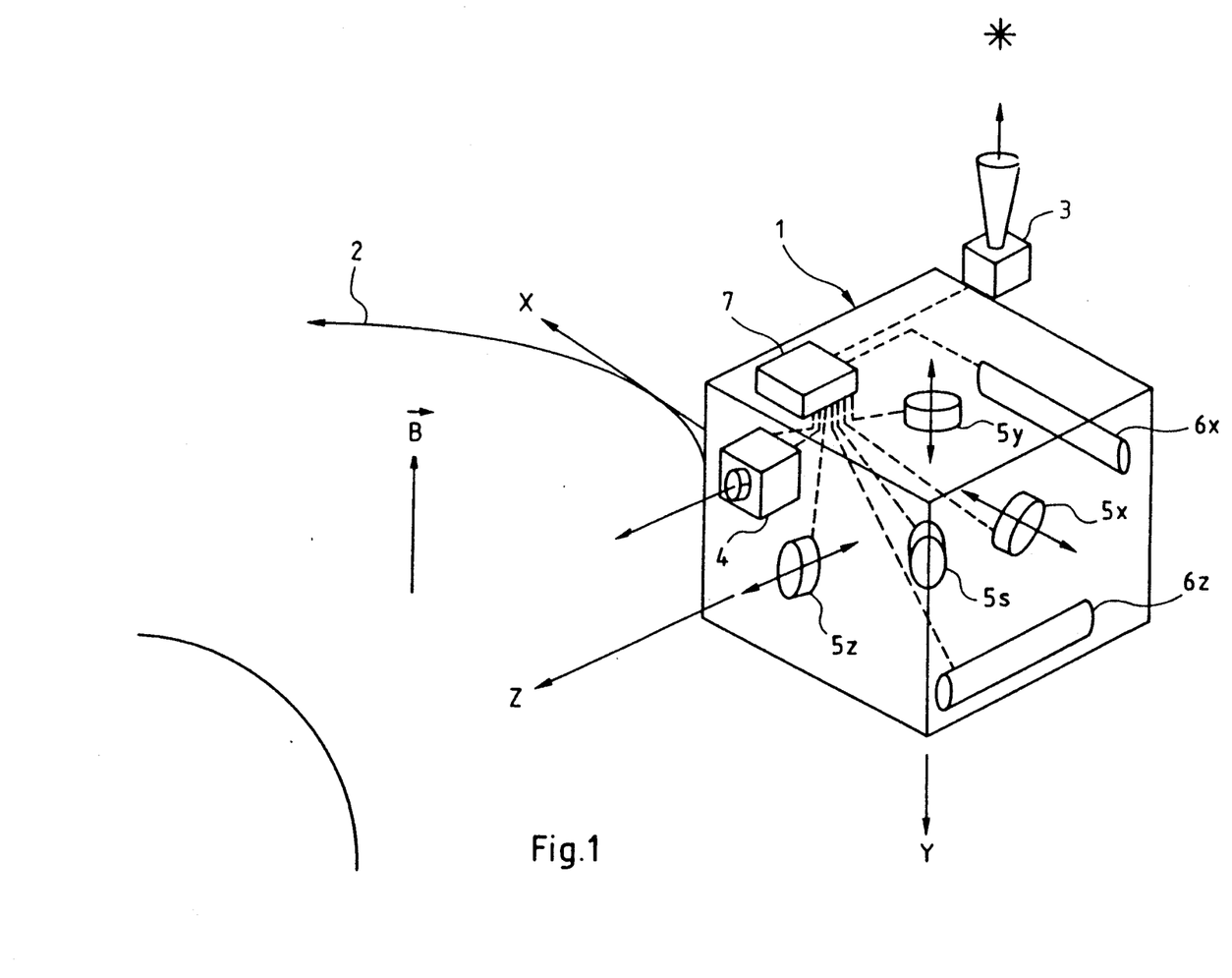
FIG. 1 is a diagrammatic view of a satellite equipped with an attitude control system in accordance with the invention.

FIG. 1 shows a satellite 1 in a terrestrial orbit 2. In the known manner the satellite is provided with various equipments that are not shown (generators, antennas, etc.) and which will not be described here as they do not constitute any part of the invention.

The satellite has three axes; a roll axis X tangential to the orbit 2, a pitch axis Y parallel to the NORTH-SOUTH axis of the EARTH and directed towards the SOUTH and a yaw axis Z directed towards the EARTH. These three axes define a right-angle trihedron.

To simplify FIG. 1 only the main component parts of the attitude control system in accordance with the invention are shown.

The three-axis attitude control system embodies:

a system for sensing the attitude of the satellite relative to the three axes which includes a Pole Star sensor 3 disposed on the NORTH face of the satellite (optionally with a second similar sensor on the SOUTH face for missions involving NORTH/SOUTH 180° slew maneuvering of the satellite) to sense yaw and roll angles and an infrared terrestrial sensor 4 on the EARTH face for sensing roll and pitch angles;

a primary attitude control system embodying three momentum wheels 5X, 5Y and 5Z adapted to supply roll, pitch and yaw torques for direct pointing of the spacecraft; a fourth wheel 5S is advantageously provided, in this example disposed along the bisector of the trihedron for redundancy;

a secondary attitude control system embodying two coils 6Z and 6X disposed in the roll-yaw plane, in this example aligned on the Z and Y axes, adapted to deliver roll and yaw torques by interacting with the terrestrial magnetic field $\vec{B}$, provided for long-term compensation of external disturbing torques (mainly solar torque in geostationary orbit); and a processor and control stage 7 with an analog or digital computer generating control signals to the control systems from the outputs of the sensing system.

This configuration has numerous advantages when pointing stability and availability are important performance criteria, which is the case in remote sensing missions in particular; these advantages are as follows:

1. The Pole State sensor 3 enables direct control of the yaw angle and therefore a minimum recovery time following an orbit control maneuver (unlike the American satellite GOES-I, for example, on which yaw is controlled indirectly via the roll sensor—it must be borne in mind that a roll offset becomes a yaw offset and vice versa every quarter-orbit—which in practice leads to transient conditions during periods of around nine hours between the end of an orbit control maneuver of the thrusters and return to nominal imaging performance in the normal operation mode).

2. Additionally, the Pole Star sensor 3 is in practice a CCD strip so that, despite the low brightness of the Pole Star (magnitude 2.3), it is possible to use a high measurement frequency, in the order of 10 Hz, with about half the measurement noise as compared with the terrestrial sensor 4; the two components 3 and 4 in combination make it possible to dispense with rate gyros in the normal operating mode (unlike the OLYMPUS spacecraft, for example, which is stabilized by a combination of momentum wheels and rate gyros), but optionally also in orbit control mode; the rate gyros are then used only during the station insertion phase and possibly in the event of a malfunction.

3. As compared with the so-called onboard momentum wheel system (as used in the GOES-I satellite), this configuration of the momentum wheels offers the following advantages: torque capability on all three axes, enabling compensation of deterministic disturbances (resetting of scanning mirrors, instrument calibration, etc.); low rotation speed (below 1,000 rpm as compared with typical speeds of 5,000 to 6,000 rpm) avoiding the problems of structural resonance (with the terrestrial sensor mechanisms, for example); and (an important advantage of the invention) the facility for fast seasonal 180° slew maneuvers using less propellant (this maneuver makes it possible to minimize impingement of solar radiation on the optical instruments in the case of a remote sensing satellite).

4. If the stability of the spacecraft at high frequencies is important use will preferably be made of magnetic bearing type momentum wheels which feature low friction and enable electronic compensation of imbalance.

5. The magnetic coils provide for continuous compensation of external roll and yaw disturbing torques; if the pitch disturbing torque is sufficiently low it may be accumulated in the pitch wheel which is desaturated only during orbit control maneuvers; then the thrusters are not used in the normal operating mode (that is to say most of the time), which eliminates the associated disturbances and some risks of failure.

The duration of magnetic storms is in practice sufficiently short for the momentum wheels to be capable of absorbing the disturbing torques and the erroneous control torques supplied by the coils before pointing and stability performance are significantly compromised.

Figure 2:
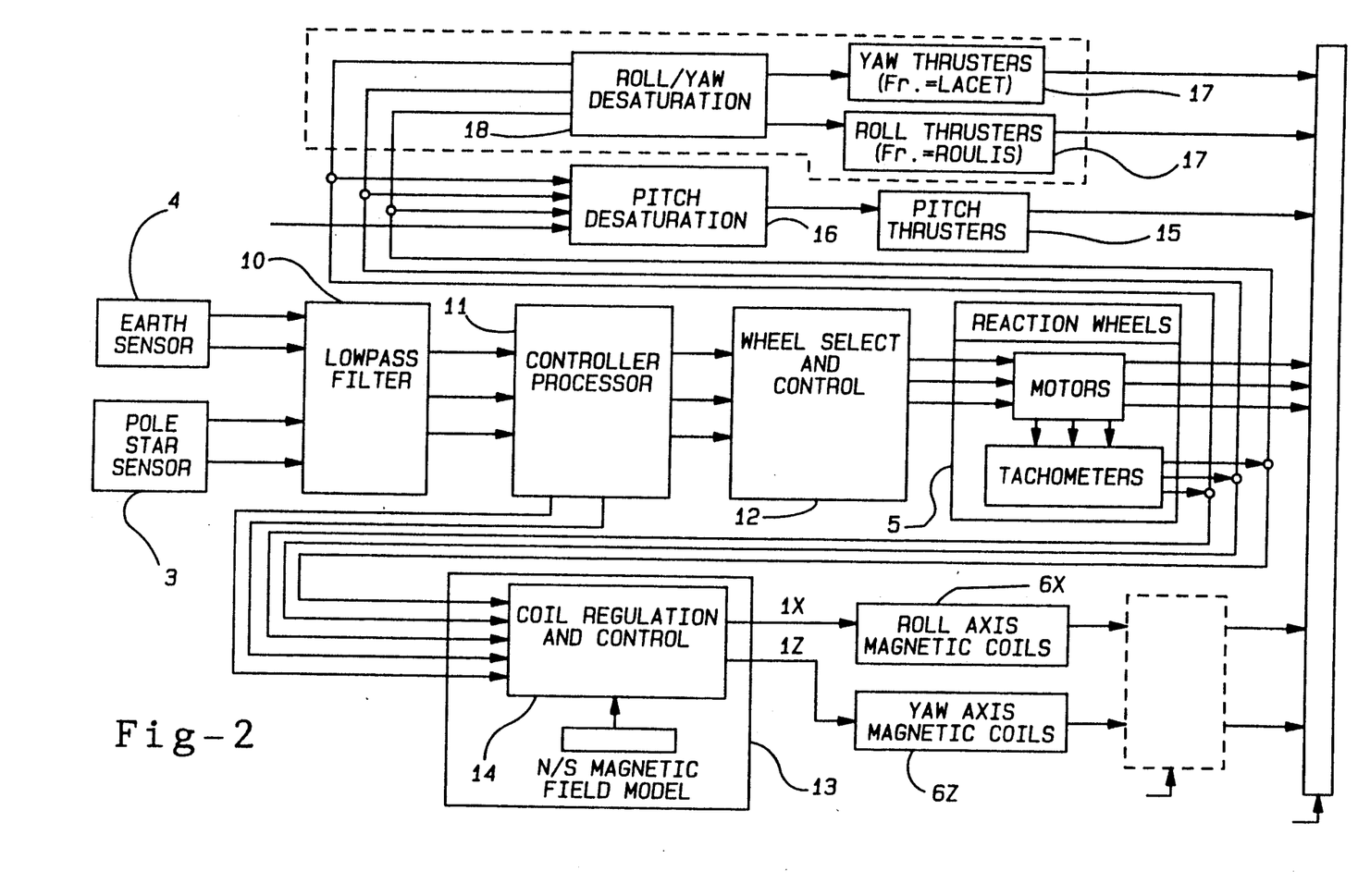
FIG. 2 is a block diagram of the system in a normal operating mode.

FIG. 2 shows the interconnections between the various attitude control components mentioned above, including the thrusters (not shown in FIG. 1) intended in principle for orbit control maneuvers.

The attitude measurement signals for these three axes are passed through a filter 10, primarily a low-pass filter, to a processor and controller 11, preferably of the "proportional-integral" type, adapted to use an algorithm that will be obvious to one skilled in the art to produce attitude control signals in the form of control signals for the momentum wheels so that these generate the necessary correcting torques. These control signals are applied to a momentum wheel selector and drive circuit 12 which generates power signals to the motors of the momentum wheels 5.

The momentum wheels are associated with tachometers delivering speed signals applied to a desaturation stage (at the top of the diagram) and to a coil regulation and control stage 13 for the magnetic coils 6X and 6Z (at the bottom of the diagram).

The control stage embodies a coil controller 14 which deduces the current I to be passed through the magnetic coils 6X and 6X from the speed signals supplied by the tachometers and from signals from the drive circuit 12 representing the momentum wheel control torque, and using a model of the NORTH-SOUTH terrestrial magnetic field. These currents generate forces applied to the satellite by interacting with the terrestrial magnetic field in accordance with LAPLACE's law (dashed outline box).

The desaturation stage primarily embodies pitch thrusters 15 controlled by a pitch desaturation circuit 16 which receives the speed signals from the tachometers 5 and optionally specific desaturation signals. Of course, these thrusters are additionally controlled by the orbit control circuit (not shown) which can be of any known type.

The magnetic coils 6X and 6Z are sufficient in practice to desaturate the roll and yaw momentum wheels. When this is not so (backup mode) the roll and yaw speed signals, upon exceeding predetermined thresholds, instigate the use of roll and yaw thrusters 17 via an associated roll/yaw desaturation circuit 18.

On the right-hand side of the FIG. 2 diagram is a dashed outline box schematically representing the "dynamics" of the satellite in response to the various forces applied by the thrusters, by the momentum wheels, by the coils interacting with the terrestrial magnetic wheels and by the pressure of solar radiation.

The FIG. 2 diagram can be seen in terms of a primary control loop using the attitude sensors and the momentum wheels only plus a slower secondary control loop in which the action of the magnetic coils 6 complements the action of the momentum wheels 5.

Figure 3:
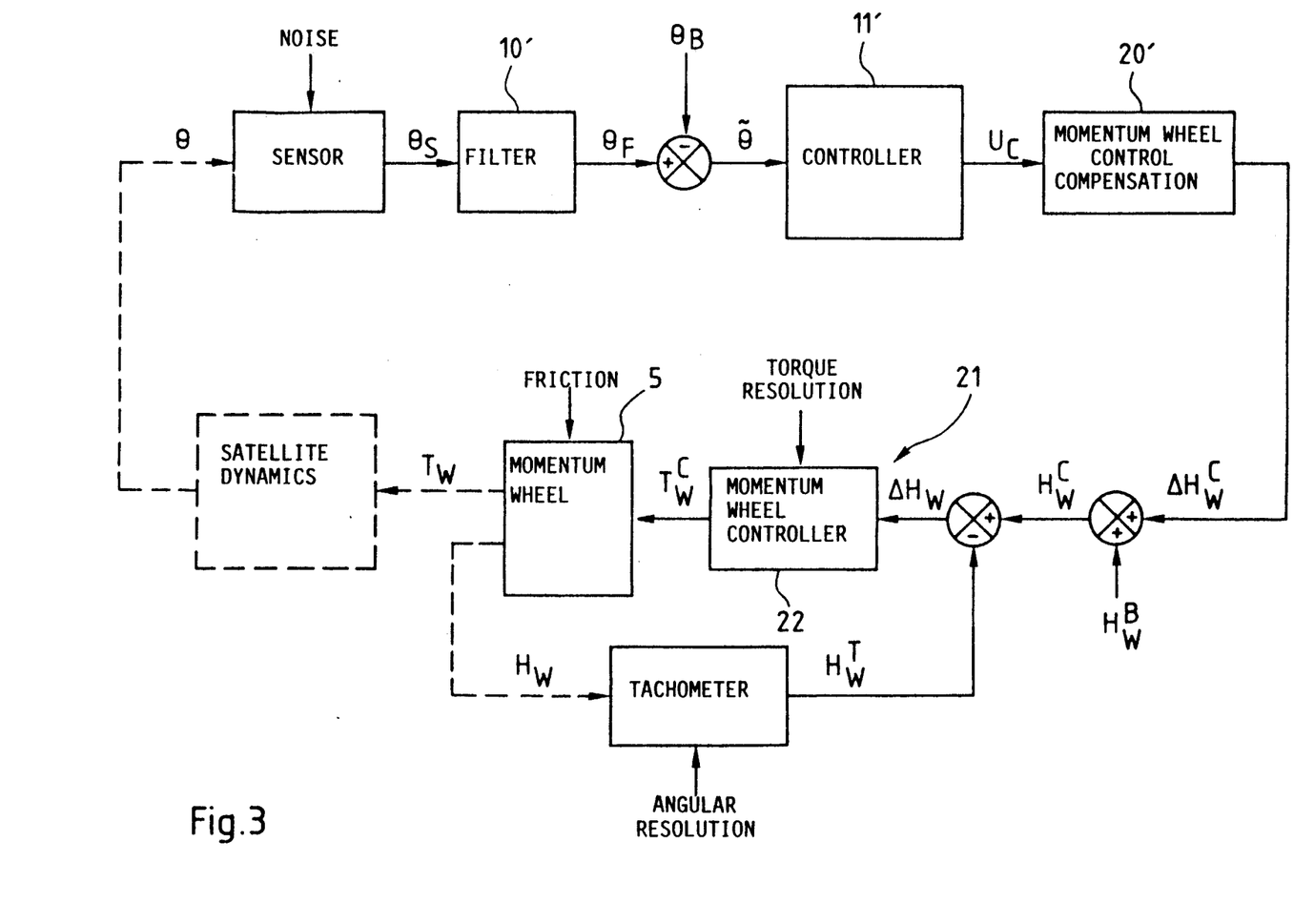
FIG. 3 is a block diagram of a primary control loop of the control system.

The primary control loop for each axis may be represented as shown in FIG. 3 in which $\Theta$ denotes the attitude of the satellite with respect to the axis in question.

The value $\Theta_S$ of this attitude parameter as measured by the sensor 3 or 4 is filtered by the circuit 10' (part of the circuit 10 from FIG. 2) to yield the filtered parameter $\Theta_F$ which is compared with a set point angular value $\Theta_B$. The error signal $\tilde{\Theta}$ is applied to a proportional-integral controller 11' (part of the circuit 11) which deduces a correction control signal $U_C$. A momentum wheel control compensation circuit 20' deduces from this a kinetic moment variation $\Delta H^C_w$ which is added to an appropriately chosen set point $H^B_w$ to obtain a set point value $H^C_w$ for a fast momentum wheel control loop 21 including a momentum wheel control circuit 22 which, given the torque resolution, applies to the momentum wheel 5 a control signal $T^C_w$. Given the dynamics of the momentum wheel, a torque $T_W$ is applied to the satellite and the tachometer measures a kinetic moment of $H^T_w$.

The circuits 20' and 22 are part of the circuit 12 from FIG. 2.

This architecture is conventional in itself and is a fast control loop specific to the momentum wheel and a slower momentum wheel control stage. The control gains are optimized (how to do this will be evident to one skilled in the art) to suit the mission (for example, the gains will be low if the chosen performance criterion is the stability of the spacecraft).

Figure 4:
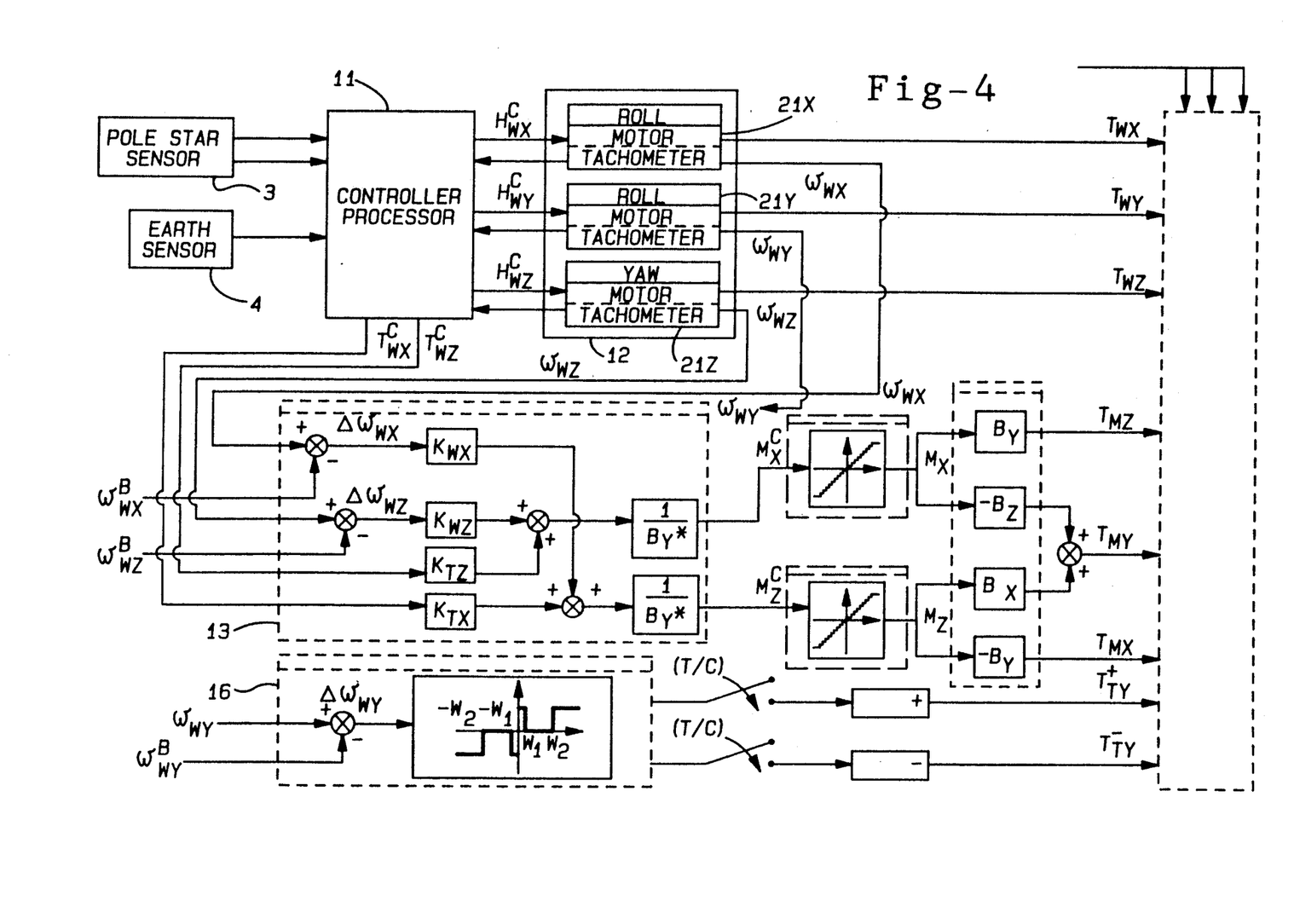
FIG. 4 is a block diagram of the control system from FIG. 2 showing details of a secondary control loop of the system.

FIG. 4 repeats the FIG. 2 diagram with more detail of the secondary loop.

It shows the sensors 3 and 4, the processor and controller 11 and the circuit 12 including a loop 21 for each of the axes receiving signals $H^C_w$. As a result a torque $T_W$ is applied to the satellite about each of the axes.

The coil regulation and control stage 13 receives speed signals $\omega_W$ associated with the roll and yaw momentum wheels, signals $T^C_w$ representative of the torques to be applied to the satellite, and optionally speed set point signals $\omega B_w$.

The roll speed error $\Delta\omega_{wx}$ is amplified (the gain is $K_{wx}$) and added to the roll control torque which is also amplified (the gain is $K_{TX}$). The result of this summation is "divided" by the component $B_y^*$ of the magnetic field calculated by means of the chosen model.

The same procedure is adopted for yaw control.

The resulting control signals $M^c$ are applied to the coils which, by interacting with the real components of the terrestrial magnetic field, apply to the satellite a magnetically generated torque $T_M$ about each of the three axes.

To control pitch, the speed $\omega_{wy}$ (or its departure from a set point value $\omega B_{wy}$) is compared with thresholds $-\omega2, -\omega1, \omega1, \omega2$ and, depending on the direction of the observed difference, thrusters are operated which act in one direction or the other about the pitch axis to apply the appropriate torque $T_T$ to the satellite.

It will be understood that the magnetic coils are supplied continuously with currents depending on the speed of the momentum wheels; the latter therefore sense disturbing torques.

FIGS. 5A through 5D show the result of a simulation of the primary attitude control loop proposed by the invention with reference to pitch control using a low-jitter proportional-integral wheel control law, the gains being optimized to minimize vibration of the spacecraft (remote sensing satellite).

Figure 5A:
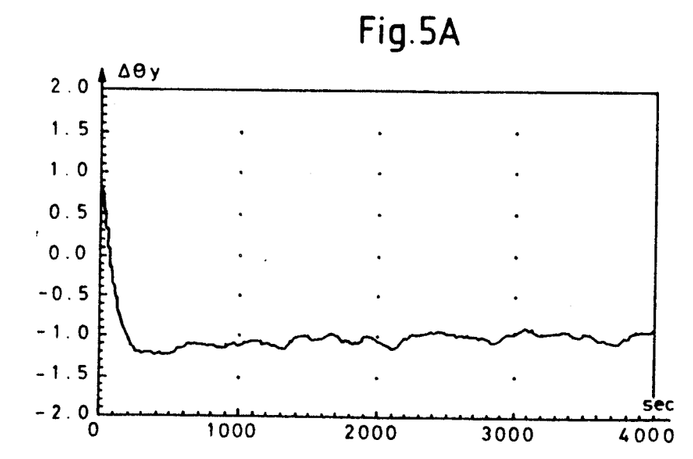
FIGS. 5A through 5D are graphical representations of measurements obtained by simulating the operation of the primary loop.

FIG. 5A plots the variation in yaw attitude as a function of time: it is in the order of −0.1 milliradian.

Figure 5B:
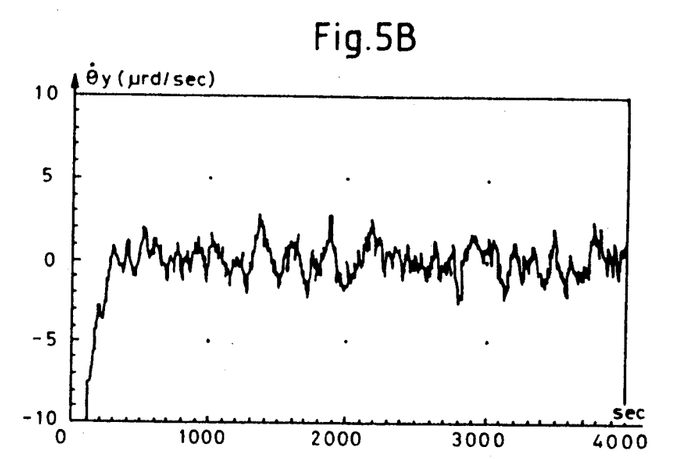

FIG. 5B shows the pitch speed.

Figure 5C:
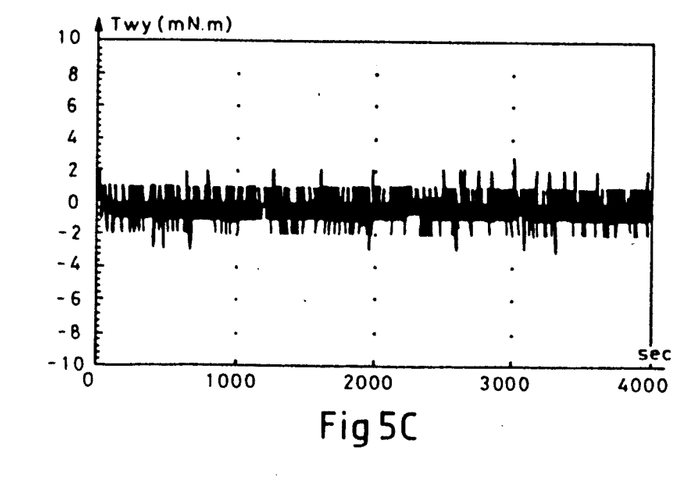
Figure 5D:
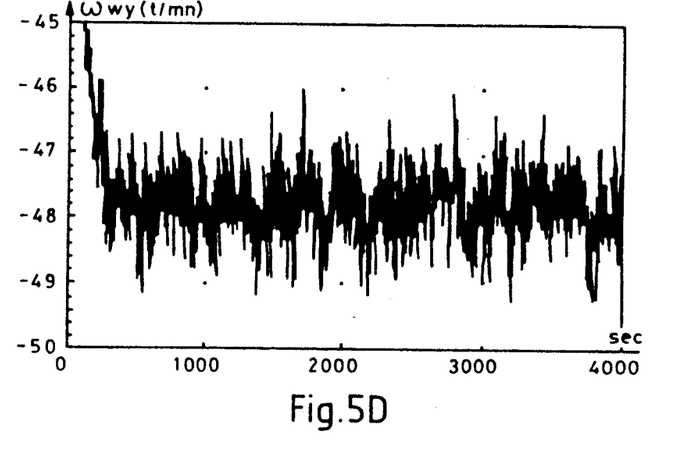

FIG. 5C shows the control torque $T_{wy}$ applied by the momentum wheel. FIG. 5D shows the speed signal supplied by the tachometer.

Note the high degree of stability obtained.

FIGS. 6A through 6D show the result of attitude control of roll in accordance with the invention during a magnetic storm (occurring between 24 and 36 hours), the satellite being in a maximal nominal NORTH-SOUTH configuration and pitch desaturation being provided by thrusters.

Figure 6A:
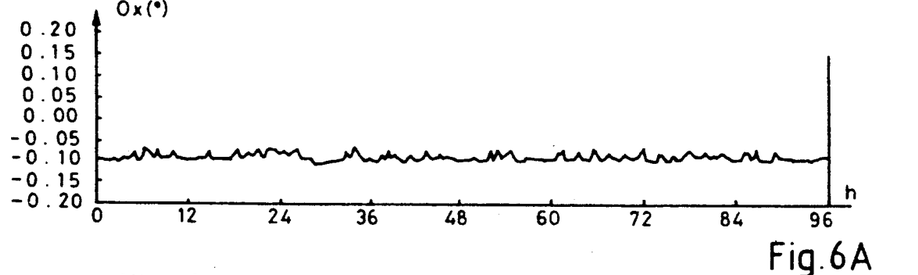
FIGS. 6A through 6D are graphical representations of measurements obtained by simulating the operation of the secondary loop in the event of a magnetic storm.

FIG. 6A shows the roll angle $O_x$.

Figure 6B:
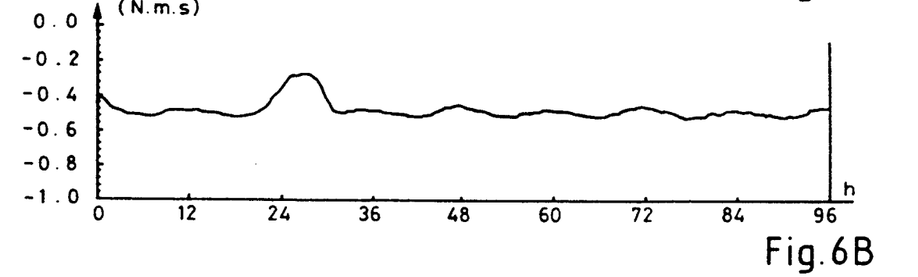

FIG. 6B shows the angular momentum of the roll momentum wheel.

Figure 6C:
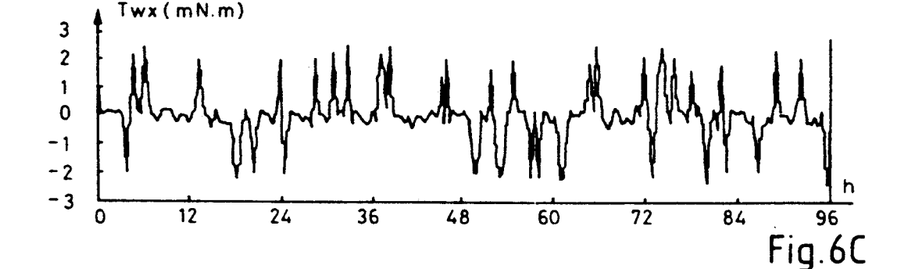

FIG. 6C shows the torque applied to the roll momentum wheel.

Figure 6D:
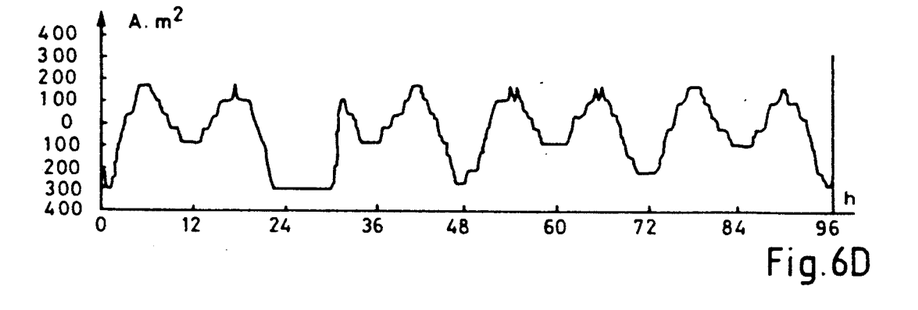

FIG. 6D shows the yaw magnetic dipole generated to desaturate the roll/yaw momentum wheels.

Note the long-term stability in roll despite the magnetic storm.

FIGS. 7A through 7G show various parameters during a seasonal NORTH/SOUTH 180° slew maneuver about the yaw axis, the satellite being provided with a Pole Star sensor on each of its NORTH and SOUTH faces and with a rate gyro. The 180° slew maneuver takes approximately 700 seconds.

Figures 7A, 7B, 7C, 7D:
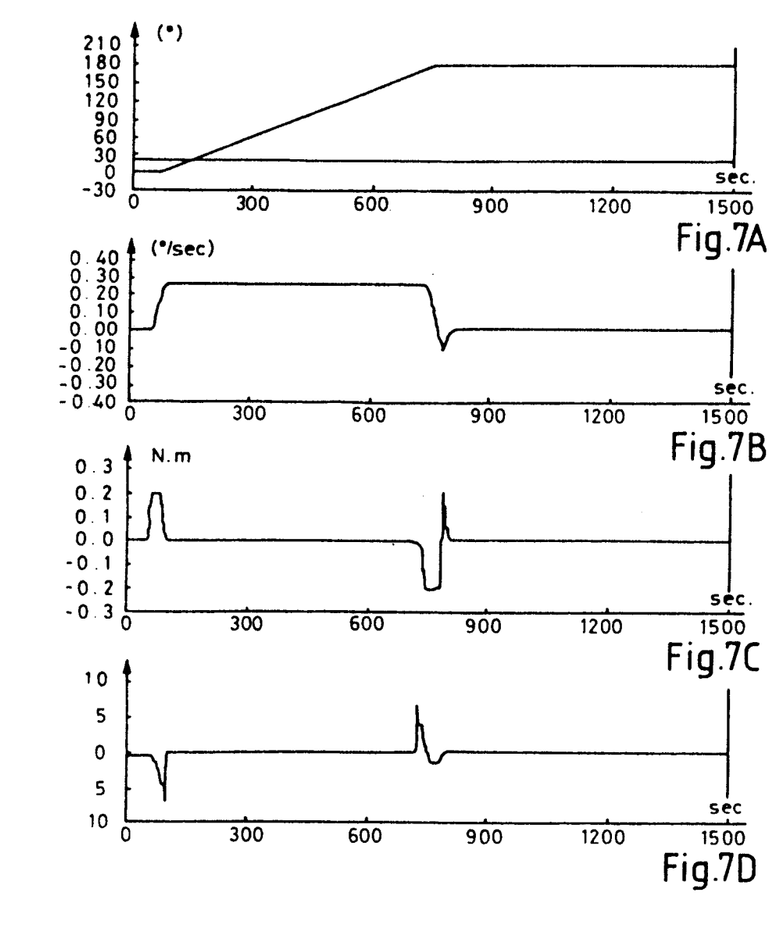
FIGS. 7A through 7G are graphical representations of measurements obtained by simulating a seasonal 180° slew maneuver about the yaw axis.

FIG. 7A shows in full line the yaw angle measured by the integrating rate gyro during the 180° slew maneuver phase and during the fine terrestrial pointing phase.

FIG. 7B shows the yaw speed measured by the rate gyro.

FIG. 7C shows the yaw momentum wheel torque.

FIG. 7D shows the yaw angle measured by the Pole Star sensor.

Figure 7E:
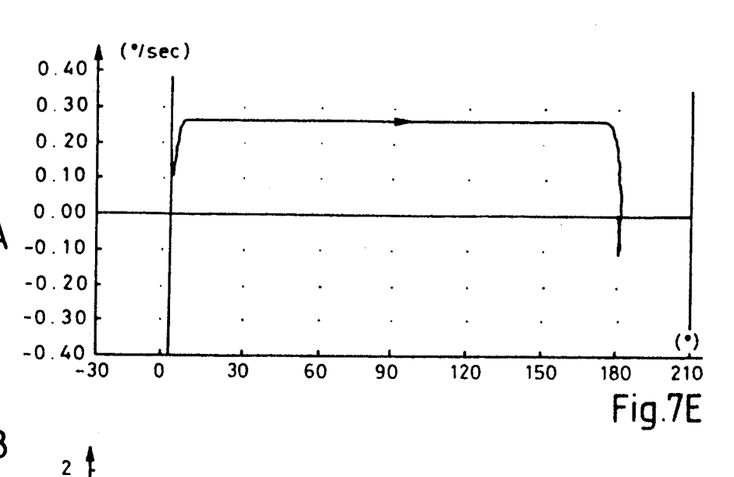

FIG. 7E shows the correlation between the yaw angle and angular speed (as seen in the phase plane).

Figures 7F, 7G:
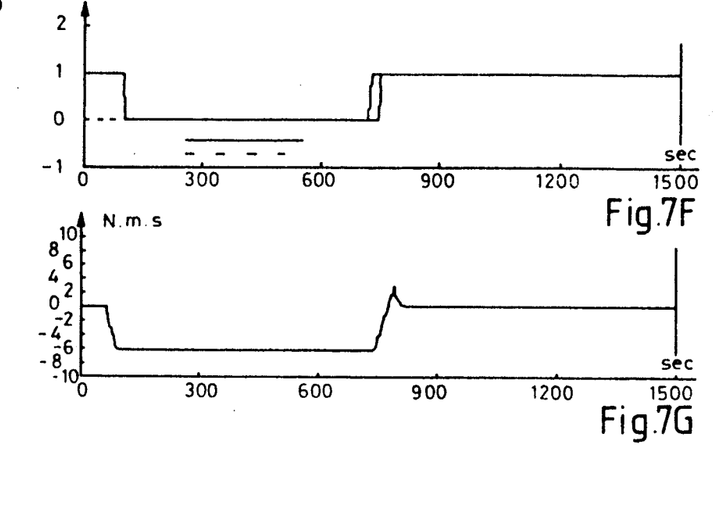

FIG. 7F shows in full line the Pole Star visibility signal and in dashed line the signal indicating that the yaw output of this sensor is used in the momentum wheel control law, the level 1 representing YES and the level 0 representing NO.

FIG. 7G shows the angular momentum of the yaw momentum wheel during the 180° slew maneuver.

The speed of the 180° slew maneuver and the short period of transient conditions following on therefrom can be seen.

It goes without saying that the foregoing description has been given by way of non-limiting example only and that numerous variants may be put forward by one skilled in the art without departing from the scope of the invention.

What is claimed is:

1. An attitude control system for use in controlling the position of a three-axis stabilized satellite in terrestrial orbit, comprising:
    a plurality of attitude sensors for sensing roll, pitch and yaw angles of said satellite;
    a set of at least three momentum wheels, one each of said at least three momentum wheels provided on an axis, which, when combined with the two additional axes of the other two of said at least three momentum wheels, forms a right-angle trihedron;
    a set of two non-parallel magnetic coils in the roll/yaw plane;
    a first control loop comprising a processor and controller connected between said plurality of attitude sensors and said set of at least three momentum wheels for determining a plurality of first correction signals based upon the output of said plurality of attitude sensors and signal values included in said processor and controller, said plurality of first correction signals transmitted to said set of at least three momentum wheels to produce correction torques;
    a second control loop comprising a coil controller connected between said processor and controller and said set of two non-parallel magnetic coils for determining a plurality of second correction signals based upon the output of said plurality of attitude sensors and signal values included in said processor and controller, said plurality of second correction signals transmitted to said set of two non-parallel magnetic coils to produce correction torques interacting with the terrestrial magnetic field;
    a pitch actuator; and
    a circuit for the desaturation in pitch connected between said set of at least three momentum wheels and said pitch actuator.

2. The system in accordance with claim 1, further comprising a plurality of tachometers, each tachometer of said plurality of tachometers being connected to a respective one of said at least three momentum wheels.

3. The system in accordance with claim 1, wherein said plurality of attitude sensors comprises a terrestrial sensor and a Pole Star sensor.

4. The system in accordance with claim 1, wherein said set of at least three momentum wheels comprises a momentum wheel aligned on the pitch axis of said satellite and two momentum wheels having their axis parallel to the roll/yaw plane.

5. The system in accordance with claim 4, wherein said two momentum wheels having their axis parallel to the roll/yaw plane are respectively aligned on the roll and yaw axes.

6. The system in accordance with claim 1, further comprising a fourth momentum wheel.

7. The system in accordance with claim 6, wherein said fourth momentum wheel is aligned on the bisector of said trihedron.

8. The system in accordance with claim 1, wherein said magnetic coils of said set of two non-parallel magnetic coils are oriented, respectively, on the roll and yaw axes.

9. The system in accordance with claim 1, wherein said processor and controller is of the proportional-integral type.

10. The system in accordance with claim 1, wherein said first control loop includes a separate control circuit for each said momentum wheel of said set of at least three momentum wheels.

* * * * *